Aug. 9, 1927.

A. EKMAN 1,638,296

VEHICLE SIGNAL

Filed Aug. 14, 1922  4 Sheets-Sheet 1

Inventor
Andrew Ekman
By Frank E. Liverance, Jr.
Attorney.

Aug. 9, 1927.

A. EKMAN 1,638,296

VEHICLE SIGNAL

Filed Aug. 14, 1922

Inventor
Andrew Ekman.
By Frank E. Liverance, Jr.
Attorney

Aug. 9, 1927. 1,638,296
A. EKMAN
VEHICLE SIGNAL
Filed Aug. 14, 1922  4 Sheets-Sheet 3

Inventor
Andrew Ekman
By Frank E. Liverance, Jr.
Attorney.

Aug. 9, 1927.  1,638,296
A. EKMAN
VEHICLE SIGNAL
Filed Aug. 14, 1922  4 Sheets-Sheet 4

Inventor
Andrew Ekman
By Frank E. Liverance Jr.
Attorney.

Patented Aug. 9, 1927.

1,638,296

UNITED STATES PATENT OFFICE.

ANDREW EKMAN, OF GRAND RAPIDS, MICHIGAN.

VEHICLE SIGNAL.

Application filed August 14, 1922. Serial No. 581,637.

This invention relates to a signal adapted particularly for use on motor vehicles to indicate to those in front and behind any contemplated change in direction of movement of the vehicle or its stopping. The signal is designed for electrical operation, and it is an object and purpose of the invention to make a signal of this character which is simple and particularly novel in construction, one which is manufactured at exceptionally low cost so as to be marketed at a low price, one which is durable and efficient in service, and one which gives a full and clear signal indication for all either in front of or behind the vehicle equipped with the signal. A further object of the invention is to produce a signal of this character in which the electric control devices therefor are particularly simple, inexpensive and effective, and to provide the same with a light which may be easily and readily cut out when not needed, as in the daytime, and as easily connected when needed at night. All of these features, as well as many others not at this time specifically enumerated, will appear as understanding of the invention is had from the following description, taken in connection with the accompanying drawings, in which, Fig. 1 is an elevation of the signal as it appears from either front or rear when in a neutral position.

Like reference characters refer to like parts in the several figures of the drawings.

In the construction a casing or housing of sheet metal is used, made up into cylindrical form as indicated at 1, at its edges being formed with beads 2 whereby annular grooves are made on the inner sides for the reception of plates 3 and 4, the former of which is of glass and is on the outside while the latter is of sheet metal and against the inner side of the glass plate. These plates are retained in place by split spring rings 5 seated in the grooves of beads 2, as shown.

Figure 1:
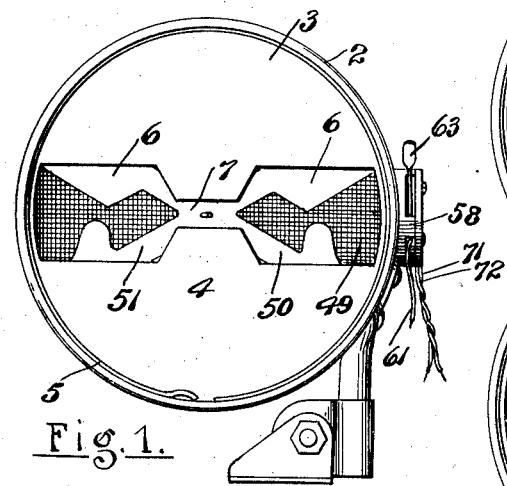
Figure 2:
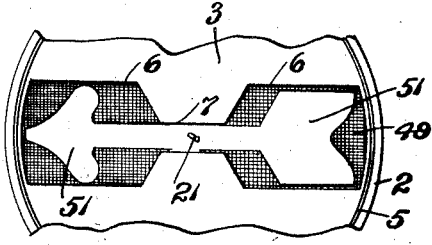
Fig. 2 is a fragmentary like elevation showing the signal indicating a change of direction to be made.
Figure 3:
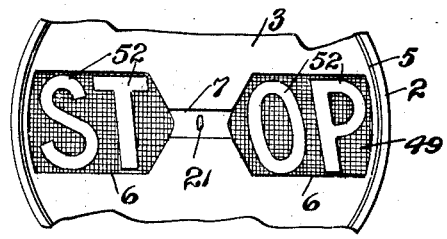
Fig. 3 is a like view with the signal in position to indicate a contemplated stopping of the vehicle.

The inner metal plates 4 having relatively wide openings 6 cut therethrough at opposite sides of the center of the plate, the same being connected by a narrower opening 7 which passes across the center of the plate as shown in Figs. 1, 2 and 3. The openings 6 and 7 are in horizontal alinement and it is through the same that the signal indications appear to those either in front of or back of the vehicle on which the signal is mounted, both ends of the casing being equipped in the same manner.

Figure 5:
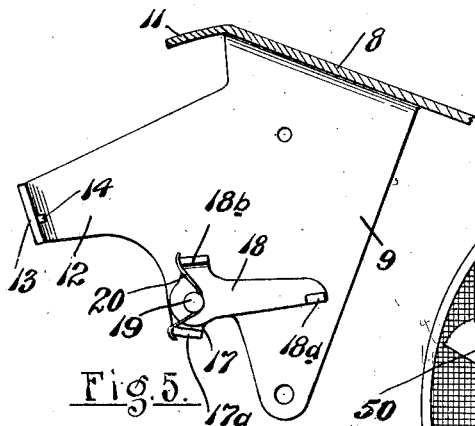
Fig. 5 is a partial section and elevation of the main supporting bracket on which the signal mechanism is mounted within the casing or housing therefor.
Figure 4:
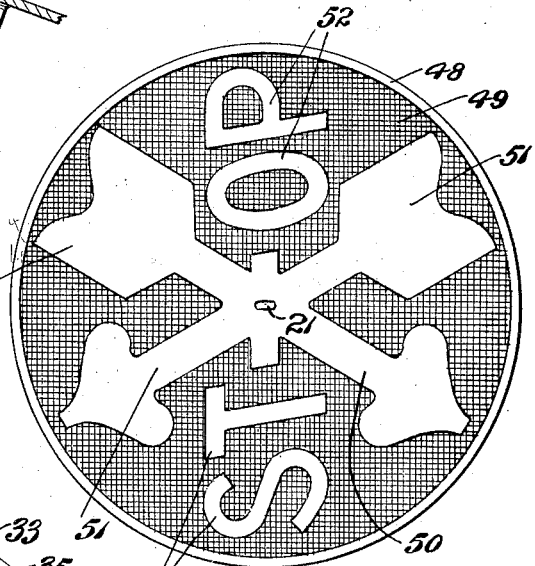
Fig. 4 is an enlarged elevation of one of the rotary signal members, showing the same in its neutral position.
Figures 6, 7:
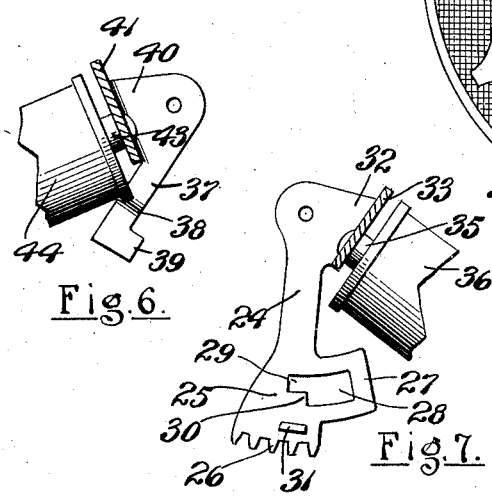
Figs. 6 and 7 are fragmentary elevations of the two electromagnets used and the arms connected therewith and operated thereby on movement thereof.
Figure 8:
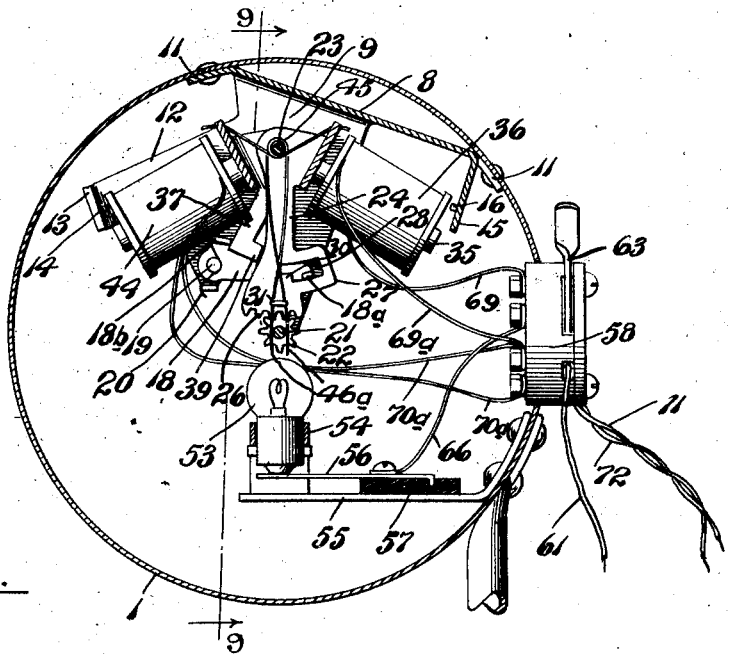
Fig. 8 is a vertical section through the signal in a plane paralleling the front and back of the casing.

Within the casing a supporting bracket is secured, the same being formed of sheet metal of heavier gage than the casing and comprising an upper side 8 and two depending spaced apart sides 9 and 10. At each end of the upper section 8, ears 11 extend and are bent slightly downwardly to conform to the inner sides of the casing 1, and to which they are permanently secured by rivets or equivalent fastening. The depending part 9 has an arm 12 extending laterally, at its end turned at right angles to form a part 13 from which a tongue 14 is struck inwardly, projecting inwardly a short distance as shown. At the opposite end of the upper side 8, a part 15 is bent downwardly having a similarly struck tongue 16 projecting inwardly. In addition, the depending side 9 of the bracket is formed between the arm 12 and the lower extending part of said side 9 with a relatively short downwardly extending arm 17, at its lower end turned at right angles to form an ear 17$^a$, as shown in Fig. 5. A lever 18 is pivotally mounted at 19 on the arm 17 above the ear 17$^a$, extending across the face of the side 9 and adjacent its end being formed with an inwardly turned lug 18$^a$, the purpose of which will later appear. The lever 18 has a short upward projection over the pivot 19, at its upper end being turned inwardly to form a lug or ear 18$^b$, and a spring 20 coiled around the pivot pin 19 has its ends engaged with the parts 17$^a$ and 18$^b$, the tendency of the spring being to move the free end of lever 18 in a downward direction.

Figure 9:
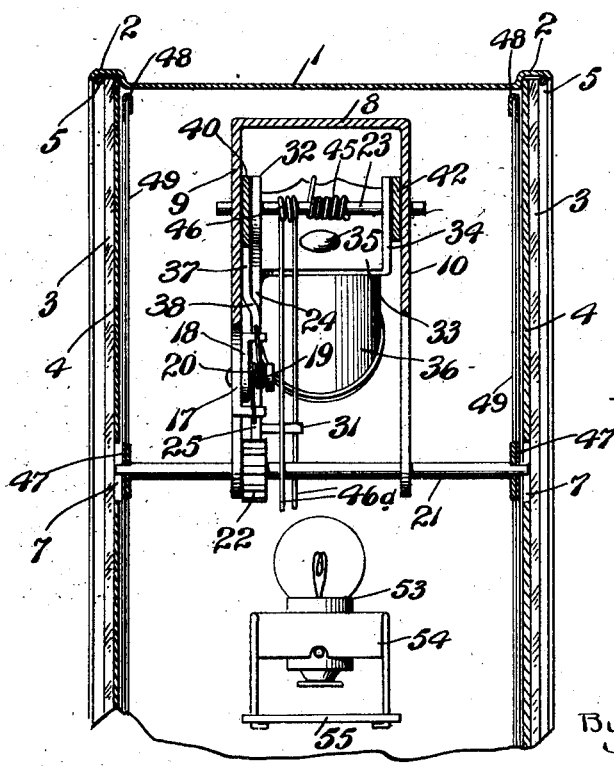
Fig. 9 is a fragmentary enlarged vertical section, taken substantially on the plane of line 9—9 of Fig. 8.

A shaft 21, nearly as long as the length of the casing, passes through the lower ends of the depending sides 9 and 10 of the bracket support, being rotatably mounted therein. A pinion 22 is fixed on the shaft adjacent the side 9 of the support. A rod 23 passes through said sides 9 and 10 (see Fig. 9) a short distance below the upper side 8 of the support. An arm 24 is loosely mounted on the rod 23, extending downwardly toward shaft 21, at its lower end being widened, as indicated at 25, the lower edge being formed with teeth 26 to mesh with the pinion 22. The wider portion or head 25 is also formed with an integral lateral projection 27 in which a relatively wide opening 28 is cut, the same being narrowed at its inner end, as shown at 29 with a shoulder 30 formed at the juncture of the two parts 28 and 29 of the opening, as shown. A short bar 31 is connected to the wider head 25 below the said shoulder 30 and extends at right angles from the same, the purpose of which will hereinafter appear.

Figure 12:
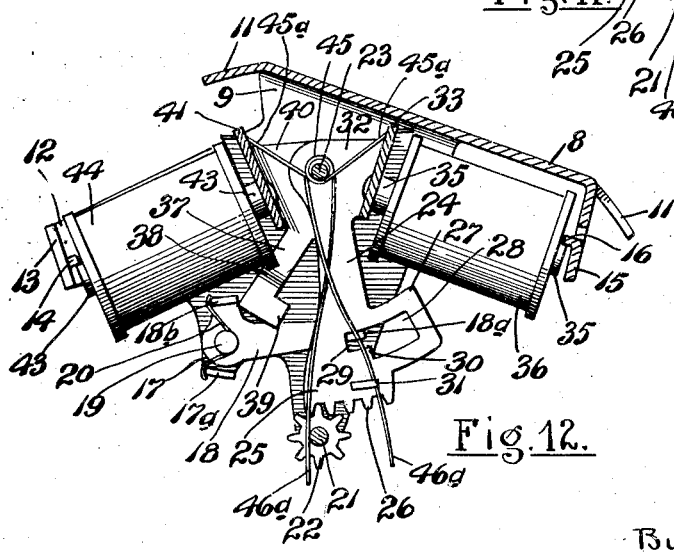
Figure 13:
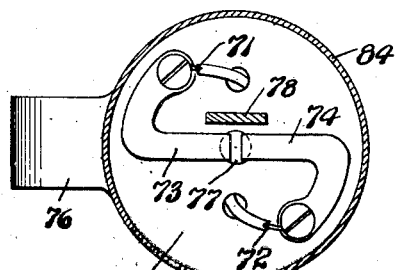
Fig. 13 is a horizontal section on the plane of line 13,—13, of Fig. 14.
Figure 15:
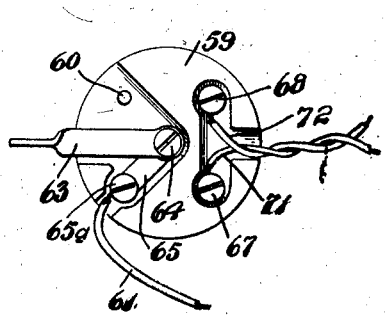
Fig. 15 is an outer side view of the junction block set in one side of the casing for connecting the wiring of the signal.
Figure 14:
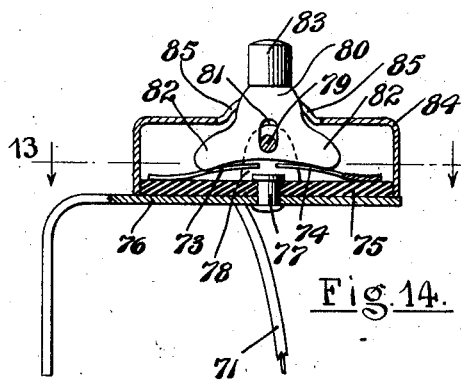
Fig. 14 is a central vertical section through the operating switch for the signal.
Figure 16:
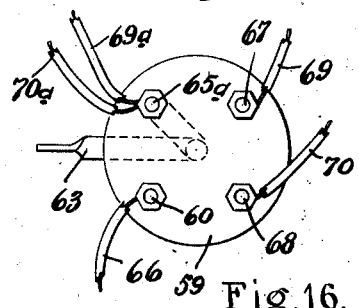
Fig. 16 is an inner side view thereof.
Figure 17:
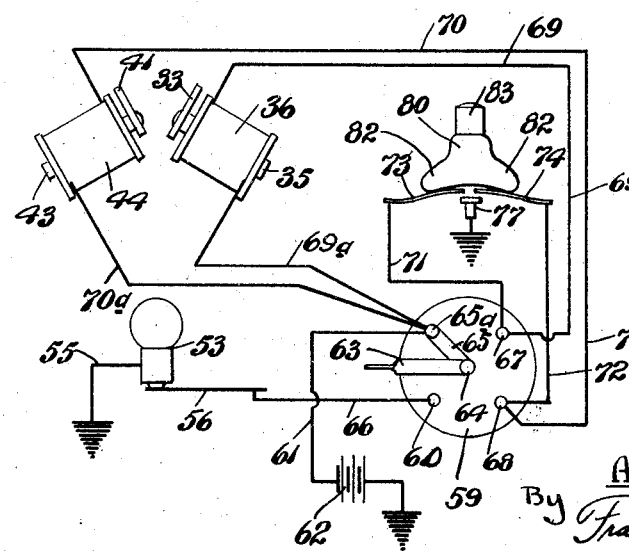
Fig. 17 is a diagrammatic lay-out of the wiring circuits used in the signal.

At its upper end arm 24 has an integral lateral extension 32 which, after a short distance is bent to substantially parallel the rod 23, as indicated at 33 and then bent back toward the rod making a part 34 through which the rod passes. The parts 32, 32, 33 and 34 form a stirrup for the connection of an electromagnet, the core 35 of which is permanently secured at one end to the part 33, around which a winding 36 is wound. The outer free end of the core 35 in its uppermost position engages against the lug 16 struck from part 15, as shown in Fig. 12.

Figure 10:
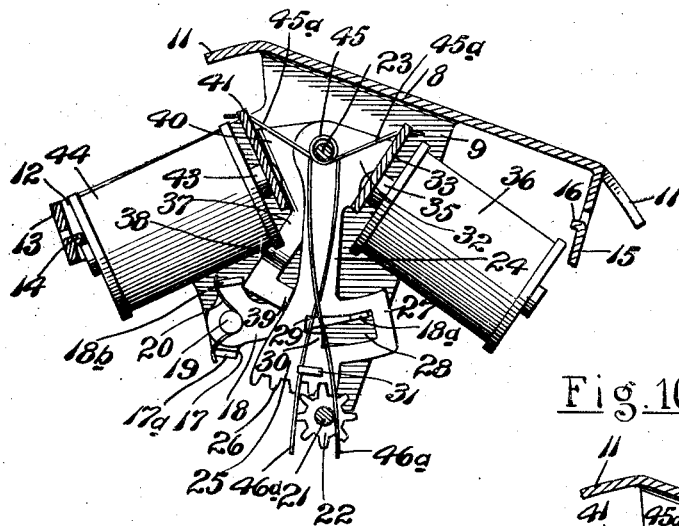
Figs. 10, 11 and 12 are partial sections and elevations, showing the operating mechanism for the signal in three different positions which it is adapted to take to show the two changes of direction and the stop indications.

A second arm 37 is loosely mounted on the rod 23 between the arm 24 and the side 9 of the support, extending downwardly and laterally for a distance and then provided with a bend 38 which brings its lower end and the lateral projection 39 thereof into the same plane with the arm 24. This arm, as well as arm 24 is formed with a stirrup construction at its upper end consisting of the parts 40, 41 and 42, the part 41 paralleling the rod 23 and having a core 43 of an electromagnet permanently connected thereto, with a winding 44 around the same. The core at its outer end engages with the stop 14 when the electromagnet is raised to its uppermost position as shown in Figs. 10 and 12. A spring 45 is coiled around the rod 23, having its ends extended as arms 45$^a$, to bear against the upper edges of the parts 33 and 41 of the stirrups. A second spring 46 is coiled around the rod 23, its ends 46$^a$ extending downwardly and crossing each other and then passing one to each side of the bar 31 and shaft 21.

At each end of the shaft 21 a disk is secured to fill the adjacent end of the casing and turn with the rotation of the shaft. Each disk comprises a reinforcing plate 47 of metal formed with a return flange 48 at its edges to pass over the edges of and secure a transparent member 49 in position on the plate 47. The member 49 is made opaque except at certain portions defining an arrow 50, a second arrow 51 and a series of letters at 52 for the word Stop. The two arrows cross each other at an acute angle and at the center of the disk and in the neutral position of the disk, neither the arrows or the word Stop show plainly through the openings at 6 and 7 in the backing plate 4. This appears in Fig. 1, portions of the arrow openings showing but giving no indication of anything. When the indicating disks are turned with the rotation of the rod or shaft 21, as hereafter described, an arrow 51 or 52 may be brought to a horizontal position, as shown in Fig. 2, clearly indicating a contemplated change in direction of movement of the vehicle, and if turned still farther, the word Stop will show through the opening 6, as in Fig. 3.

An electric bulb 53 is mounted in a suitable holder 54, fixed on a bar 55 in turn connected to the casing 1, thereby making a ground connection for the bulb. The lower end of the bulb is engaged by a spring contact bar 56 which is secured to a block 57 of insulating material which is attached to the upper side of the bar 55. In the side of the casing 1, a junction box is placed and secured, including a housing 58 of sheet metal which houses a junction disk 59 of insulating material on which the various connections between the wiring to the light bulb and electromagnets within the casing is made with the wires leading from the outside to the casing. A contact post 60 on the disk has a wire 66 leading therefrom to the spring contact bar 56. A wire 61 connected with a battery 62 or other suitable source of electric energy leads to a post 65$^a$ passing through the disk, from which a bar 65 leads to the center of the disk, a switch lever 63 being pivotally mounted at 64 at the inner end of the bar 65 and adapted to swing into and out of contact engagement with the contact 60. When in engagement, it is apparent that the light circuit is completed, and the bulb 53 will be lighted, but when not in such contact engagement, the bulb is not lighted. The switch lever 63 is readily accessible for manual operation and the light circuit may be completed or broken at will.

Two additional binding posts 67 and 68 pass through the disk 59 and wires 69 and 70, respectively, are connected to the inner ends thereof, leading to the windings 36 and 44, respectively, of the electromagnets, the return wires 69$^a$ and 70$^a$ from said windings connecting to the inner end of the post 65$^a$. Wires 71 and 72 lead from the outer ends of the posts 67 and 68, respectively to two spring members 73 and 74, forming parts of a switch which is mounted on the steering wheel or the dash or other conveniently accessible place for manual operation by the driver of the vehicle. These spring members are fastened to a base 75 of insulating material, in turn fixed to a bracket 76 having a ground connection to the vehicle, and the adjacent free ends thereof are normally located a short distance above the upper end of a short post 77 which passes through the base 75 and connects with the bracket 76.

An ear 78 extends upwardly from the bracket 76 through the base 75 and carries a pin 79 which passes through a vertical slot 81 in a movable switch member 80, of insulating material, said member being formed with oppositely extending fingers 82 to lie one above each spring member 73 and 74. The switch member is equipped with an operating button or head 83 at its upper end and at its upper portion passes through the top of a housing 84 of sheet metal, the same being slotted at both sides of the switch member, at 85, to permit either the lateral tilting of the member in either direction, or the direct downward movement thereof. When tilted in one direction, it is evident that one only of the spring members 73 or 74 is forced downwardly into contact engagement with the post 77. When moved directly downwardly, both spring members are brought into contact with the post.

If a turn to the right is to be made, the switch member is tilted to the right and spring member 74 engaged against post 77. A circuit is thereupon completed through the winding at 44 energizing the core 43 which moves toward the part 13 of the metal bracket support. This moves arm 37 to the left (referring to Fig. 10) withdrawing the stop end 39 from the arm 24, and the arms 45$^a$ of the spring 45 are tensioned, causing the arm 24 and attached parts to follow whereupon the shaft 21 is turned through pinion 22 and the teeth 26 in a counterclockwise direction, sufficient to bring the arrow 50 into horizontal position to show through the openings 6 and 7 in the plate 4. As soon as the switch is released and the circuit broken, the springs 45 and 46 return the parts to neutral position.

Figure 11:
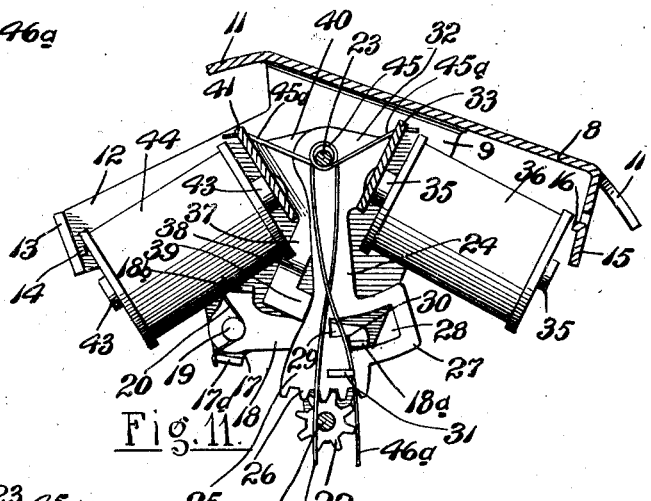

For a left hand turn, the switch member is tilted to the left bringing the member 73 into contact with post 77 and closing the circuit through the winding 36, energizing core 35 which moves toward the part 15 with a resultant turning of arm 24 and rotation of the shaft 21 and attached disk signal members in a clockwise direction and bringing arrow 51 to horizontal position for showing through the openings 6 and 7. The extent of rotary movement is limited through the lug 18$^a$ on lever 18 engaging against the shoulder 30, as shown in Fig. 11, the lever being free to move to lower position through the spring 20 and by gravity during this operation. Release of the switch and breaking of the circuit frees the parts for return to neutral position as before.

When the switch is pressed directly downward, both circuits through both windings 36 and 44 are completed, both cores 43 and 35 are energized and the outer ends of both cores move upward toward their respective attracted parts 13 and 15, as in Fig. 12. The arms 24 and 37 move in opposite directions and the shaft 21 is rotated in a clockwise direction. It is rotated farther this time than when the left turn is indicated, as the lower end of the arm 37 strikes against the part 18$^b$ of the lever 18, elevating the free end of the lever so as to bring the stop lug 18$^a$ above the shoulder 30. This additional rotation permitted turns the indicating disks so that the word Stop is brought to horizontal position and shows through the openings 6 in plate 4, as it appears in Fig. 3.

The light may be either lighted or unlighted during the operations of the signal, having no effect thereon. In the neutral position, sufficient of the arrow openings for the passage of light is left to indicate the position of the signal at night and call attention thereto when a change in position of the signal disks is made. In practice the signal may be placed at the left of the driver, or any other suitable place on the vehicle. It is apparent that the length of wire needed is small, the two wires 71 and 72 leading to the control switch not being of any great length necessarily, while the one wire 61 leading to the battery will be of greater length but not excessive. The parts are readily stamped from sheet metal at comparatively low cost. All of the parts are low in cost and the manufacturing cost and selling price are low. The operation of the signal is sure and positive. The movement of the energized cores toward the parts 13 and 15 is smooth and easy due to the indirect line of attraction and the stopping does not induce any strains from jar or other abrupt stop of the movements, as the cores would stop in any event when directly in line with the parts 13 and 15. The construction is practical in every respect and has so proved in practice. The appended claims define the invention and I consider myself entitled to all forms of construction coming within their scope.

I claim:

1. In a device of the character described, an indicating disk provided with two arrows crossed between their ends at the center of the disk and positioned at an acute angle with respect to each other and with the word Stop located across the face of the disk across and between the ends of the arrows.

2. In a device of the character described, a disk having the major portion thereof opaque and provided with transparent portions in the shape of arrows crossing each other at an acute angle to each other at the center of the disk, and with other transparent portions consisting of the letters S and T between one end of the arrows, and the letters O and P between the opposite ends of the arrows.

3. In a device of the character described, a cylindrical casing, a plate located in an end of the casing having horizontal elongated openings in alinement with the horizontal diameter of the plate, a shaft rotatably mounted lengthwise and centrally of the casing, an indicating disk secured at the end of the shaft carrying three indicating characters indicating right and left and stop, said indicating characters being located diametrically across the disk at different positions, and means to selectively and electrically actuate the shaft to turn it to three separate positions to bring any selected indicating character into horizontal position to show through said openings in the plate.

4. In a device of the character described, an enclosing casing having openings in a vertical side thereof located horizontally in alignment with each other on opposite sides of the center of the casing, a shaft rotatably mounted therein, a disk at the end of the shaft and adjacent an end of the casing provided with a plurality of indicating characters located diametrically across the disk at angles to each other, means normally positioning the shaft and disk so that each of the indicating characters lies at an angle to the horizontal, and means for effecting rotation of the shaft to any one of a plurality of positions whereby an indicating character on the disk is positioned horizontally, substantially as described.

5. In combination with a cylindrical housing, a plate in each end of the housing having elongated horizontal openings therein, a disk rotatably mounted at the inner side of each plate and having a plurality of indicating characters thereon located diametrically across the disk at angles to each other, said disks in normal neutral position being located so that no indicating character lies horizontally across the disks, and electrically operated means for selectively turning the disks to any one of a plurality of positions wherein one of the indicating characters is located horizontally to show through the openings in said plates.

6. In a device of the character described, a cylindrical casing, a plate having horizontally alined openings therein located in one end of the casing, a shaft rotatably mounted within and lengthwise of the casing, a disk fixed at the end of the shaft, said disk having the major portion thereof opaque and with three series of indicating indicia disposed diametrically across the disk at angles to each other, said indicia permitting passage of light therethrough, operating means connected with the shaft normally positioned so that no indicating indicia is disposed horizontally across the disk, and means for selectively operating said operating means to turn the shaft to and hold it in three different positions wherein one of the indicating indicia is disposed horizontally across the disk to be visible through the openings in the plate, a different indicia being visible at each position of the disk.

7. In a device of the character described, a casing, a shaft rotatably mounted therein, a pinion on the shaft, a pivotally mounted arm formed at one end with teeth to engage the pinion, a second pivotally mounted arm having a free end adapted to engage against an edge of the first arm, an electromagnet connected with and movable with each arm, means for selectively energizing either magnet, metal members located adjacent the free ends of the magnets and toward which the magnets move when energized, connections between the arms for moving the first arm in one direction when the magnet connected to the second arm is energized and opposite to its movement when the magnet connected thereto is energized, and an indicating disk member connected to the end of the shaft, substantially as described.

8. In a device of the character described, a casing, a shaft rotatably mounted therein, a pinion on the shaft, a pivotally mounted arm formed at one end with teeth to engage the pinion, a disk having two crossed indicating arrows thereon secured at an end of the shaft, a plate in the end of the casing having an elongated horizontal opening therethrough, means normally acting on the arm to position the disk so that said arrows lie at angles to the horizontal, and means for selectively actuating the arm in opposite directions about its pivot to thereby rotate the disk in opposite directions from its normal position to bring either arrow into horizontal position in conjunction with the opening in the plate, substantially as described.

9. In a device of the character described, a horizontally positioned cylindrical casing, a bracket support therein attached to the upper side of the casing and having two spaced apart depending sides, a shaft rotatably mounted in and passing through the lower ends of said sides longitudinally and centrally of the casing, a pinion on the shaft, a disk attached to one end of the shaft, and having its major portion opaque and with portions permitting the passage of light in the form of two arrows crossing each other at an angle to each other at the center of the disk, and with letters forming the word Stop positioned vertically on the disk between the ends of the arrows, a plate at one end of the casing adjacent said disk formed with an elongated horizontal opening therethrough, a rod passing through the depending sides of the bracket above the shaft, two stirrups loosely mounted on the rod in opposition to each other, one of said stirrups having a downwardly extending arm at one side formed at its lower end with a widened portion having an opening therethrough wider at its outer than at its inner end with a shoulder at the juncture of the wider and narrower parts of the opening, teeth on the lower edge of the said widened portion of the arm in mesh with the pinion, a lever pivotally mounted on one of the depending sides of the bracket formed at its free end with a lug passing into said opening in the arm and provided with an upward extension and inturned ear at the upper end thereof over its pivot, a spring normally tending to move the free end of the lever in a downward direction, a second arm depending from the other stirrup and formed at its lower end with a head lying in the same plane with the first arm and said ear on the lever, a spring around the rod having its ends extended over and engaging with the stirrups, an electromagnet core connected to each of the stirrups, said bracket support being formed with parts turned to lie immediately beyond the outer ends of the cores when the same are in upper position, and windings on said cores, substantially as and for the purposes described.

10. A construction containing the elements in combination defined in claim 9, combined with a member attached near the lower end of the first arm and extending therefrom parallel to the shaft, and a second spring around the rod having depending ends crossing each other and passing on opposite sides of said member and the shaft, substantially as described.

11. A construction containing the elements defined in combination in claim 9, combined with stops struck from the parts of the bracket support adjacent the outer ends of the cores, said stops lying in the paths of movement of the cores.

12. A device of the class described, comprising a cylindrical casing, a plate in the end of the casing having a horizontal diametrically located elongated opening therethrough, a rotatably mounted disk located parallel to and adjacent said plate and carrying three series of indicating characters located diametrically across the disk at angles to each other, electrically actuated means associated with the disk to turn the same to three different positions away from its normal position to bring any selected indicating character into horizontal position to show through the opening in the plate, and means for manually selecting and causing the operation of said turning means for showing of a selected indicating character.

13. A device of the class described, comprising a casing, a plate in one end of the casing having a horizontal diametrically located elongated opening therethrough, a rotatably mounted disk located parallel to and adjacent said plate and carrying a plurality of indicating characters located diametrically across the disk at angles to each other, means associated with the disk to turn the same and normally positioning the disk so that no indicating character thereon is located horizontally, and means for selectively causing the operation of said turning means to turn the disk to any one of a plurality of positions in which a selected indicating character is located horizontally to show through the opening in the plate, substantially as described.

14. A shaft and means for moving the same to different positions comprising a pinion on the shaft, a pivoted arm having gear teeth meshing with said pinion, means for yieldably holding the arm and returning it to normal position, means for moving the arm in one direction, a stop to engage the arm to limit its movement in said direction, a second pivoted arm, means for moving it in the opposite direction, yieldable means connecting said arms whereby the first arm is moved with the second arm in said opposite direction and means on the second arm to disengage the said stop from the first arm.

15. A shaft and means for moving the same to different positions comprising a pinion on the shaft, a pivoted arm having teeth to mesh with said pinion, a second pivoted arm, an electromagnet on each arm, stationary armatures to which the magnets are attracted, when energized, to move the respective arms in opposite directions, yieldable means connecting said arms whereby one yieldably moves the other, means to yieldably hold the first arm in normal position, a stop to engage the first arm to limit its movement in one direction, means on the second arm to disengage the stop from the first arm and electric circuits including selective means for controlling the same whereby either or both of said magnets may be energized.

In testimony whereof I affix my signature.

ANDREW EKMAN.